United States Patent
Kanzal Venkatesha

(10) Patent No.: US 12,490,145 B2
(45) Date of Patent: Dec. 2, 2025

(54) METHOD AND APPARATUS FOR ENHANCING QUALITY OF EXPERIENCE IN CASE OF DROPPED OR DELAYED PACKETS

(71) Applicant: Rakuten Symphony, Inc., Tokyo (JP)

(72) Inventor: Hari Swaroop Kanzal Venkatesha, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/923,490

(22) PCT Filed: Sep. 9, 2022

(86) PCT No.: PCT/US2022/043036
§ 371 (c)(1),
(2) Date: Mar. 14, 2024

(87) PCT Pub. No.: WO2024/054216
PCT Pub. Date: Mar. 14, 2024

(65) Prior Publication Data
US 2024/0236762 A1   Jul. 11, 2024

(51) Int. Cl.
*H04W 28/04* (2009.01)
*H04L 1/1607* (2023.01)
(Continued)

(52) U.S. Cl.
CPC ........... *H04W 28/04* (2013.01); *H04L 1/1657* (2013.01); *H04W 72/21* (2023.01); *H04W 74/0833* (2013.01)

(58) Field of Classification Search
None
See application file for complete search history.

(56) References Cited

U.S. PATENT DOCUMENTS

2015/0016312 A1   1/2015   Li et al.
2015/0295692 A1*  10/2015  Gowda .................. H04L 1/1854
                                                    370/336
(Continued)

FOREIGN PATENT DOCUMENTS

JP   2016-528791 A   9/2016
JP   2017-526225 A   9/2017
(Continued)

OTHER PUBLICATIONS

International Search Report dated Jan. 24, 2023 issued in International Application No. PCT/US 22/43036.
(Continued)

*Primary Examiner* — Guerrier Merant
(74) *Attorney, Agent, or Firm* — Sughrue Mion, PLLC

(57) ABSTRACT

A method is performed by at least one processor in a network node operating in a wireless communication network. The method includes receiving, from at least one user equipment (UE), a data stream including one or more data packets associated with an uplink transmission between the UE and the network node. The method further includes analyzing the data stream to determine whether the at least one UE transmitted one or more data packets not received by the network node. The method further includes, in response to determining the at least one UE transmitted the one or more data packets not received by the network node, performing a corrective action on the data stream. The method further includes completing the uplink transmission based on the data stream after the corrective action is performed.

20 Claims, 7 Drawing Sheets

(51) Int. Cl.
*H04W 72/21* (2023.01)
*H04W 74/0833* (2024.01)

(56) References Cited

U.S. PATENT DOCUMENTS

| | | |
|---|---|---|
| 2015/0372788 A1 | 12/2015 | Xiao et al. |
| 2020/0044794 A1 | 2/2020 | Bae et al. |
| 2021/0274380 A1* | 9/2021 | Balasubramanian ........................ H04W 28/0278 |

FOREIGN PATENT DOCUMENTS

| | | | | |
|---|---|---|---|---|
| WO | WO-2013102469 A1 * | 7/2013 | ............. | H01L 43/08 |
| WO | WO-2017014802 A1 * | 1/2017 | ............. | H04L 45/22 |

OTHER PUBLICATIONS

Written Opinion dated Jan. 24, 2023 issued in International Application No. PCT/US 22/43036.
Translation of Communication issued Oct. 21, 2025 in Japanese Application No. 2025-508828.

\* cited by examiner

FIG. 3

| Data_SQ1 | Data_SQ2 | Data_SQ4 | Data_SQ5 | Data_SQ6 |

300

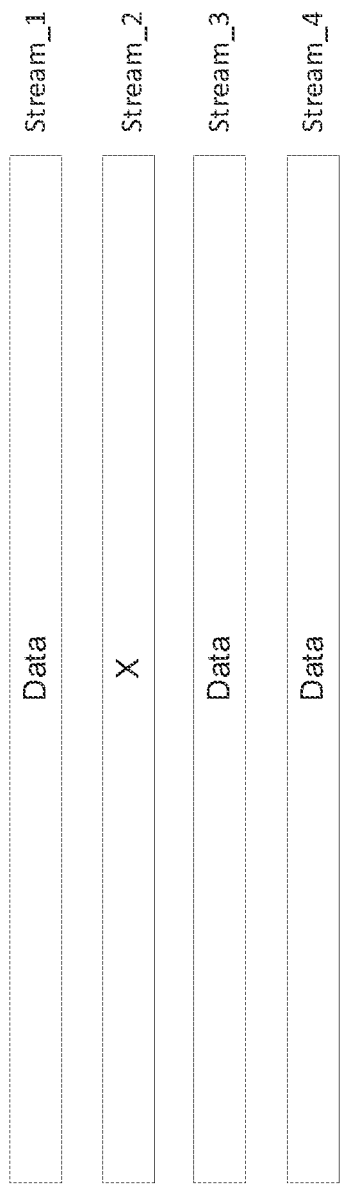
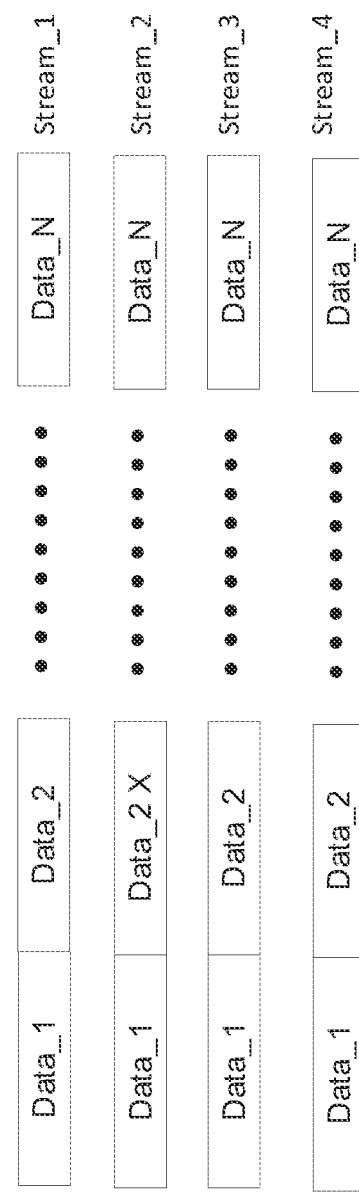

METHOD AND APPARATUS FOR ENHANCING QUALITY OF EXPERIENCE IN CASE OF DROPPED OR DELAYED PACKETS

CROSS REFERENCE TO RELATED APPLICATIONS

This application is a National Stage of International Application No. PCT/US2022/043036, filed Sep. 9, 2022.

TECHNICAL FIELD

The present disclosure relates generally to communication systems, and more particularly to methods and apparatuses for handling dropped or delayed packets.

BACKGROUND

The Open Random Access Network (ORAN) base station's (gNB/ODU) first operation in uplink is to process packets incoming on a CU plane. With network congestion, faulty hardware, insufficient hardware, characteristics of network transport, there is a high possibility of packets getting dropped which will cause service degradation to the user. The packet drops caused in the system cause wrong behavior in decoding which in-turn causes UEs not getting attached in case of Physical Random Access Channel (PRACH), UEs seeing Radio Link Failure (RLF) because of Physical Uplink Shared Channel (PUSCH) failures, degradation in throughput because of Uplink Control Information (UCI) over PUSCH and Physical Uplink Control Channel (PUCCH) failures.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for handling dropped or delayed packets.

According to exemplary embodiments, a method is performed by at least one processor in a network node operating in a wireless communication network. The method includes receiving, from at least one user equipment (UE), a data stream including one or more data packets associated with an uplink transmission between the UE and the network node. The method further includes analyzing the data stream to determine whether the at least one UE transmitted one or more data packets not received by the network node. The method further includes, in response to determining the at least one UE transmitted the one or more data packets not received by the network node, performing a corrective action on the data stream. The method further includes completing the uplink transmission based on the data stream after the corrective action is performed.

According to exemplary embodiments, a network node operating in a wireless communication network includes at least one memory configured to store computer program code and at least one processor configured to access said at least one memory and operate as instructed by said computer program code. The computer program code includes receiving code configure to cause at least one of said at least one processor to receive, from at least one user equipment (UE), a data stream including one or more data packets associated with an uplink transmission between the UE and the network node. The computer program code further includes analyzing code configured to cause at least one of said at least one processor to analyze the data stream to determine whether the at least one UE transmitted one or more data packets not received by the network node. The computer program code further includes, in response to determining the at least one UE transmitted the one or more data packets not received by the network node, performing code configured to cause at least one of said at least one processor to perform a corrective action on the data stream. The computer program code further includes completing code configured to cause at least one of said at least one processor to complete the uplink transmission based on the data stream after the corrective action is performed.

According to exemplary embodiments, a non-transitory computer readable medium having instructions stored therein, which when executed by a processor in a network node operating in a wireless communication network cause the processor to execute a method that includes receiving, from at least one user equipment (UE), a data stream including one or more data packets associated with an uplink transmission between the UE and the network node. The method further includes analyzing the data stream to determine whether the at least one UE transmitted one or more data packets not received by the network node. The method further includes, in response to determining the at least one UE transmitted the one or more data packets not received by the network node, performing a corrective action on the data stream. The method further includes completing the uplink transmission based on the data stream after the corrective action is performed.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIG. 3 illustrates sequence numbering associated with a stream of data packets, in accordance with various embodiments of the present disclosure:

FIGS. 5A and 5B illustrate example received data streams, in accordance with various embodiments of the present disclosure:

DETAILED DESCRIPTION

Figure 1:
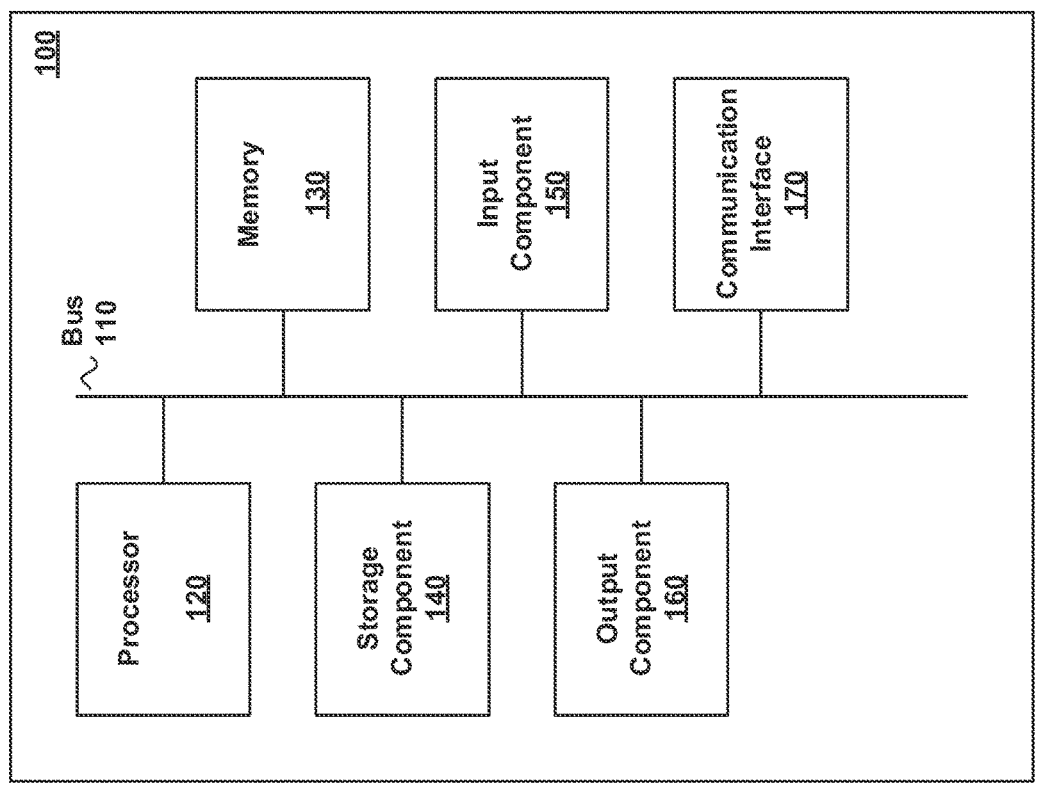
FIG. 1 is a diagram of an example network device in accordance with various embodiments of the present disclosure.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments are directed to handling lost or delayed packets during transmission of packets to a network node such as a base station. The embodiments provide the significantly advantageous features of preventing degradation of performance even if some packets are lost and recover them to maintain Quality of service for the customer and to avoid an incorrect Key Performance Indicator (KPI) declaration. With multiple streams being received, the embodiments manage decoding of data even when only a single stream of the multiple streams is received. As a result, the embodiments render moot the need to receive data from all the streams in case of packet drop. To achieve these advantages, resilient mechanisms in the CU and User plane are added to get the data decoded even with one or more packets getting lost. Even when some sections of data are lost, a network node can still decode the signal if the code rate is relatively low, which may be the case in any of the real time networks.

FIG. 1 is diagram of an example device for performing translation services. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
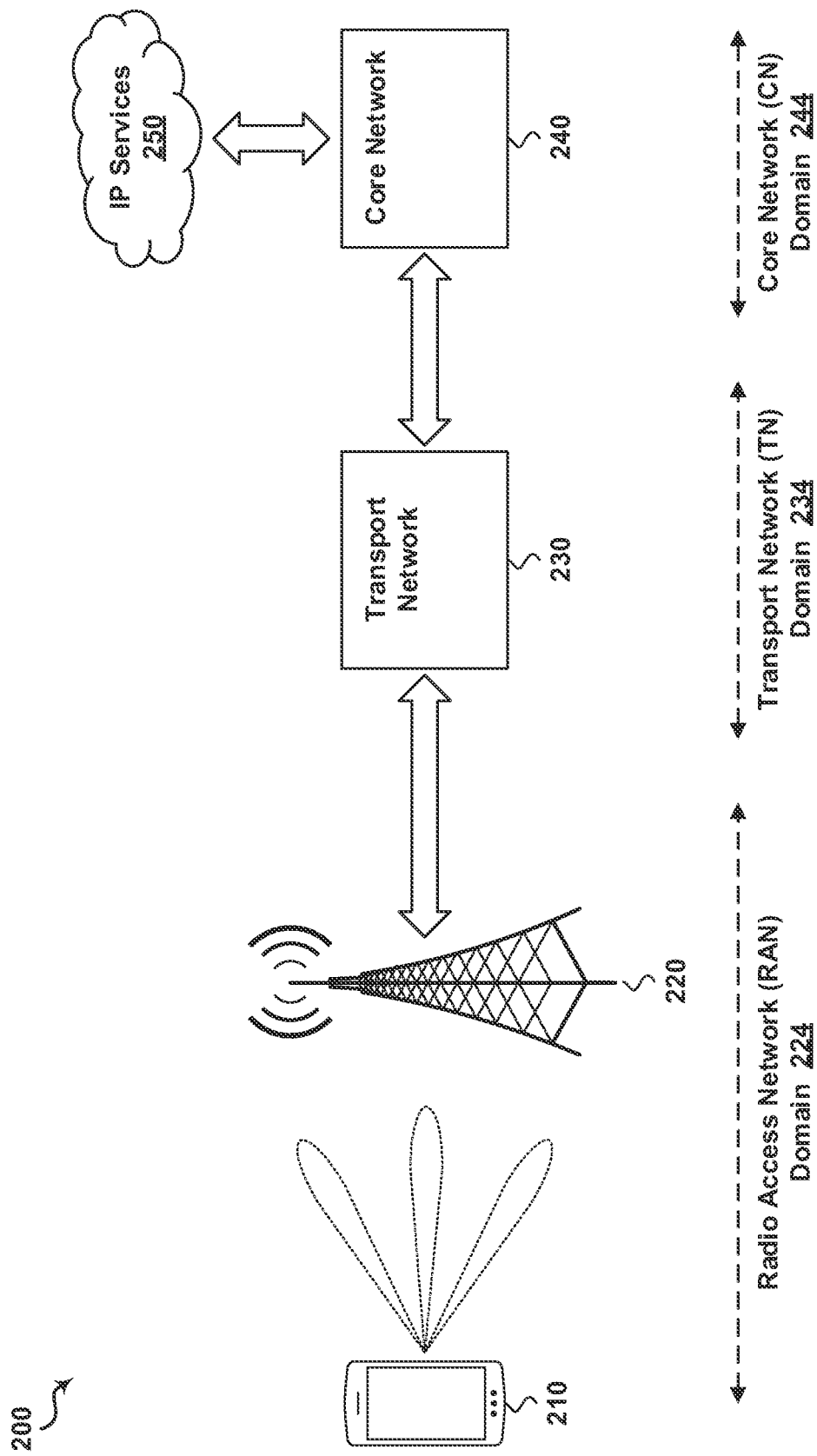
FIG. 2 is a schematic diagram of an example wireless communications system, in accordance with various embodiments of the present disclosure.

FIG. 2 is a diagram illustrating an example of a wireless communications system, according to various embodiments of the present disclosure. The wireless communications system 200 (which may also be referred to as a wireless wide area network (WWAN)) may include one or more user equipment (UE) 210, one or more base stations 220, at least one transport network 230, and at least one core network 240. The device 100 (FIG. 1) may be incorporated in the UE 210 or the base station 220.

The one or more UEs 210 may access the at least one core network 240 and/or IP services 250 via a connection to the one or more base stations 220 over a RAN domain 224 and through the at least one transport network 230. Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220 may wirelessly communicate with the one or more UEs 210 over the RAN domain 224. Each base station of the one or more base stations 220 may provide communication coverage to one or more UEs 210 located within a geographic coverage area of that base station 220. In some embodiments, as shown in FIG. 2, the base station 220 may transmit one or more beamformed signals to the one or more UEs 210 in one or more transmit directions. The one or more UEs 210 may receive the beamformed signals from the base station 220 in one or more receive directions. Alternatively or additionally, the one or more UEs 210 may transmit beamformed signals to the base station 220 in one or more transmit directions. The base station 220 may receive the beamformed signals from the one or more UEs 210 in one or more receive directions.

The one or more base stations 220 may include macro-cells (e.g., high power cellular base stations) and/or small cells (e.g., low power cellular base stations). The small cells may include femtocells, picocells, and microcells. A base station 220, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

The one or more base stations 220 may be configured to interface (e.g., establish connections, transfer data, and the like) with the at least one core network 240 through at least one transport network 230. In addition to other functions, the one or more base stations 220 may perform one or more of the following functions: transfer of data received from the one or more UEs 210 (e.g., uplink data) to the at least one core network 240 via the at least one transport network 230, transfer of data received from the at least one core network 240 (e.g., downlink data) via the at least one transport network 230 to the one or more UEs 210.

The transport network 230 may transfer data (e.g., uplink data, downlink data) and/or signaling between the RAN domain 224 and the CN domain 244. For example, the transport network 230 may provide one or more backhaul links between the one or more base stations 220 and the at least one core network 240. The backhaul links may be wired or wireless.

The core network 240 may be configured to provide one or more services (e.g., enhanced mobile broadband (eMBB), ultra-reliable low-latency communications (URLLC), and massive machine type communications (mMTC), etc.) to the one or more UEs 210 connected to the RAN domain 224 via the TN domain 234. As an example, the core network 240 performs the translation service. Alternatively or additionally, the core network 240 may serve as an entry point for the IP services 250. The IP services 250 may include the Internet, an intranet, an IP multimedia subsystem (IMS), a streaming service (e.g., video, audio, gaming, etc.), and/or other IP services.

In some embodiments, a packet is determined to be dropped or delayed based on a sequence number associated with the packet. For example, when a packet is received at the base station out of sequence, it may be determined that the UE transmitted a packet that is dropped or delayed. The RX_SEQID_ERR_C parameter may be used as the sequence ID. FIG. 3 illustrates and example data stream 300 with an associated sequence ID. As an example, the data stream 300 may be received by network node 220 (FIG. 2). The first packet has a sequence number "Data_SQ1," the second packet has a sequence number "Data_SQ2," etc. As illustrated in FIG. 3, packets with sequence numbers "Data_SQ2" and "Data_SQ4" are consecutively received. Accordingly, based on this received sequence, the network node 220 may determine that the packet with sequence "Data_SQ3" is either dropped or missing.

According to some embodiments, the data stream transmitted from the UE 210 to the network node 220 correspond to PRACH preamble sequences transmitted for uplink synchronization with a wireless communication network via a PRACH process. In some embodiments, the data stream transmitted from the UE 210 to the network node 220 correspond to uplink control information on the PUCCH. In some embodiments, the data stream transmitted from the UE 210 to the network node 220 correspond to uplink data on the PUSCH.

Figure 4A:
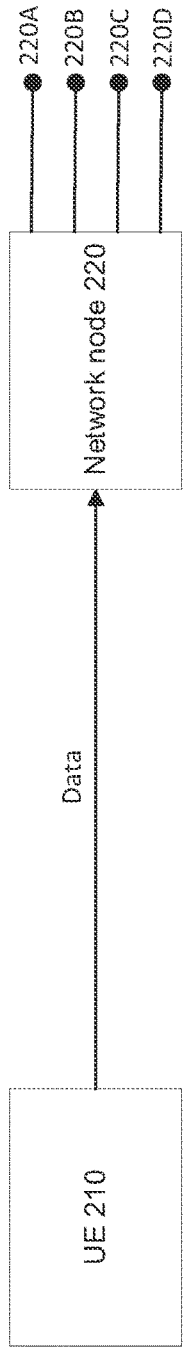
FIGS. 4A-4D illustrate example data packet transmissions, in accordance with various embodiments of the present disclosure.

FIG. 4A illustrates an example data stream transmitted from UE 210 to network node 220. The network node 220 may include a plurality of antennas such as antennas 220A, 220B, 220C, and 220D. As illustrated on FIG. 4A, a data stream without repetitions is transmitted to network node 220. The data stream may be transmitted on a respective beam corresponding to each antenna of the network node 220. Accordingly, the network node 220 receives a respective data stream for each antenna.

Figure 4B:
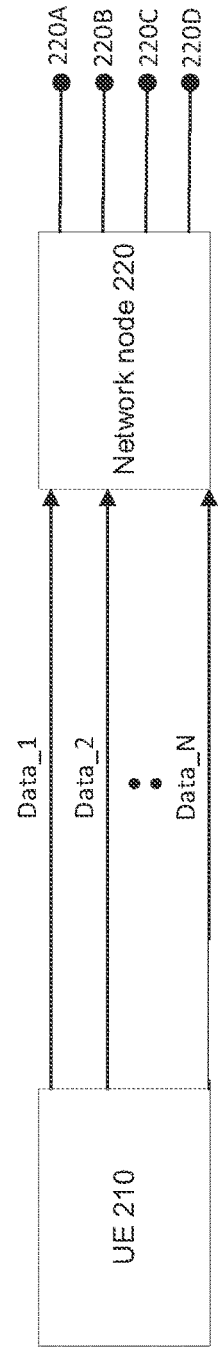
Figure 4C:
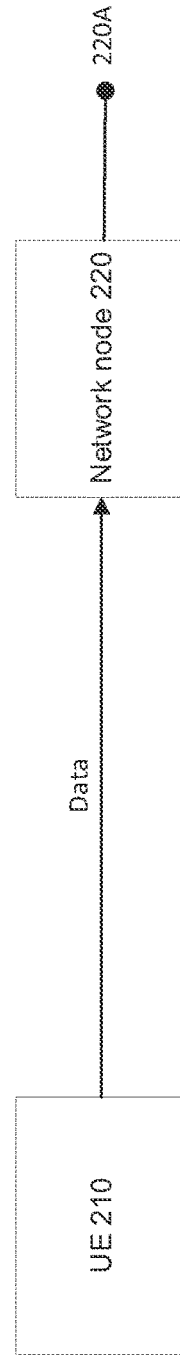
Figure 4D:
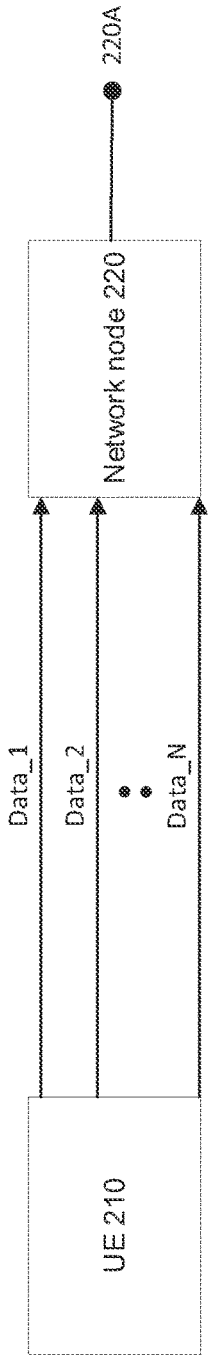

FIG. 4B illustrates an example data stream with N repetitions transmitted to the network node 220 with antennas 220A, 220B, 220C, 220D. Each antenna of the network node 220 may receive each repetition. For example, antenna 220A receives each of repetitions Data_1 to Data_N. FIG. 4C illustrates an example data stream transmitted from UE 210 to network node 220 in which network node 220 includes a single antenna 220A. FIG. 4D illustrates an example data stream with N repetitions transmitted to the network node in which the network node 220 includes the single antenna 220A.

Referring to FIG. 4A, in case of dropped packets for PRACH, (i) where there is a chance of UE 210 not being admitted to the network, and (ii) where there are multiple streams (e.g., antennas 220A-220D) with no repetitions, when one of the data streams is lost, data from the first received stream may be replicated on all other streams or zeroed out. For example, FIG. 5A illustrates streams Stream_1, Stream_2, Stream_3, and Stream_4, which may correspond to antennas 220A, 220B, 220C, and 220D, respectively. As illustrated in FIG. 5A, the data stream is received on Stream_1, Stream_3, and Stream_4. However, the data was not properly received on Stream_2.

In some embodiments, data properly received on one stream is copied to the stream that did not receive the data. For example, in FIG. 5A, data received on Stream_1 is copied to Stream_2. Data from streams Stream_3 and Stream_4 may also be copied to Stream_2. In some embodiments, data properly received on one stream is copied to all other streams. For example, in FIG. 5A, data from Stream_1 is copied to Stream_2, Stream_3, and Stream 4. In some embodiments, the stream that did not properly receive the data is zeroed out. For example, in FIG. 5A, Stream_2 is zeroed out. Based on these embodiments, it is possible to decode the packets transmitted from the UE 210 to the network node 220 even if packets are lost. Referring to FIG. 5A, for example, if data from Stream_2 were used, there would be inaccurate decoding of the PRACH due to incorrect data being available in the buffers.

Referring to FIG. 4B, in case of dropped packets for PRACH, (i) where there is a chance of UE 210 not being admitted to the network, and (ii) where there are multiple streams (e.g., antennas 220A-220D) with repetitions (e.g., Data_1, Data_2, ... Data_N), multiple U planes may be received. In some embodiments, for PRACH, the number of repetitions N is 12. If a U plane is lost, the repetitions that are lost may be zeroed out or not used during combining of the data. For example, FIG. 5B illustrates streams Stream_1, Stream_2, Stream_3, and Stream_4, which may correspond to antennas 220A, 220B, 220C, and 220D, respectively. As illustrated in FIG. 5A, the data stream with each repetition (e.g., Data_1, Data_2, ... Data_N) is received on Stream_1, Stream_3, and Stream_4. However, the data was not properly received on Stream_2. In this regard, Stream_2 did not properly receive repetition Data 2.

In some embodiments, the repetitions that are lost are zeroed out. For example, in FIG. 5B, the repetition Data_2 on Stream_2 is zeroed out or alternatively, all the repetitions on Stream_2 are zeroed out. In some embodiments, the repetitions that are lost are not used during combining of the received data. For example, in FIG. 5B, the repetition Data_2 on Stream_2 is not used in the combining of data or alternatively, all the repetitions on Stream_2 are not used. In some embodiments, data repetitions properly received on one stream is copied to the stream that did not properly receive a repetition. For example, in FIG. 5B, data repetitions Data_1, Data_2, Data_N from Stream_1 are copied to Stream_2. In some embodiments, data repetitions properly received on one stream are copied to all other streams. For example, in FIG. 5B, data repetitions Data_1, Data_2, Data_N from Stream_1 are copied to Stream_2, Stream_3, and Stream_4. Referring to FIG. 5B, for example, if repetition Data_2 from Stream_2 were used, there would be inaccurate decoding of the PRACH due to incorrect data being available in the buffers.

Figure 6A:
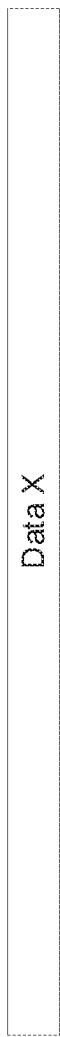
FIGS. 6A and 6B illustrate example received data streams, in accordance with various embodiments of the present disclosure.

Referring to FIG. 4C, in case of dropped packets for PRACH, (i) where there is a chance of UE 210 not being admitted to the network, and (ii) where there is one stream (e.g., antenna 220A) with no repetition, a scenario may occur where all packets are lost. In some embodiments, if all the packets are lost, corrective action may be taken at the Media Access Control (MAC) layer to understand this error and indicate this error as infrastructure error instead of an error related to normal operation. This procedure makes sure incorrect KPI are not reported. For example, in FIG. 6A, since there is only one stream, if the data stream is lost, then no data is properly received at the network node 220. Accordingly, if no data is received, corrective action may be taken at the MAC layer.

Figure 6B:

Referring to FIG. 4D, in case of dropped packets for PRACH, (i) where there is a chance of UE 210 not being admitted to the network, and (ii) where there is one stream (e.g., antenna 220A) with repetitions (e.g., Data_1, Data_2, ... Data_N), multiple U planes may be received. If a U plane is lost, the repetitions that are lost may be zeroed out or not used during combining of the received data repetitions. For example, in FIG. 6B, data repetition Data_2 was not properly received. In some embodiments, Data_2 may be zeroed out or alternatively, not used during combining of the data repetitions.

Referring to FIG. 4A, in case of dropped packets for PUSCH/PUCCH, (i) where there is a chance of control information not being decoded, and (ii) where there are multiple streams, UL data may be received at each steam. If one data stream is lost, data from one stream may be copied to the stream in which data was not properly received, or alternatively, the data that was not properly received may be zeroed out. For example, in FIG. 5(A), the data stream is received on Stream_1, Stream_3, and Stream_4. However, the data was not properly received on Stream_2.

In some embodiments, data properly received on one stream is copied to the stream that did not receive the data. For example, in FIG. 5A, data received on Stream_1 is copied to Stream_2. In some embodiments, data properly received on one stream is copied to all other streams. For example, in FIG. 5A, data from Stream_1 is copied to Stream_2, Stream_3, and Stream_4. In some embodiments, the stream that did not properly receive the data is zeroed out. For example, in FIG. 5A, Stream_2 is zeroed out. Based on these embodiments, it is possible to decode the packets transmitted from the UE 210 to the network node 220 even if packets are lost.

Figure 7:
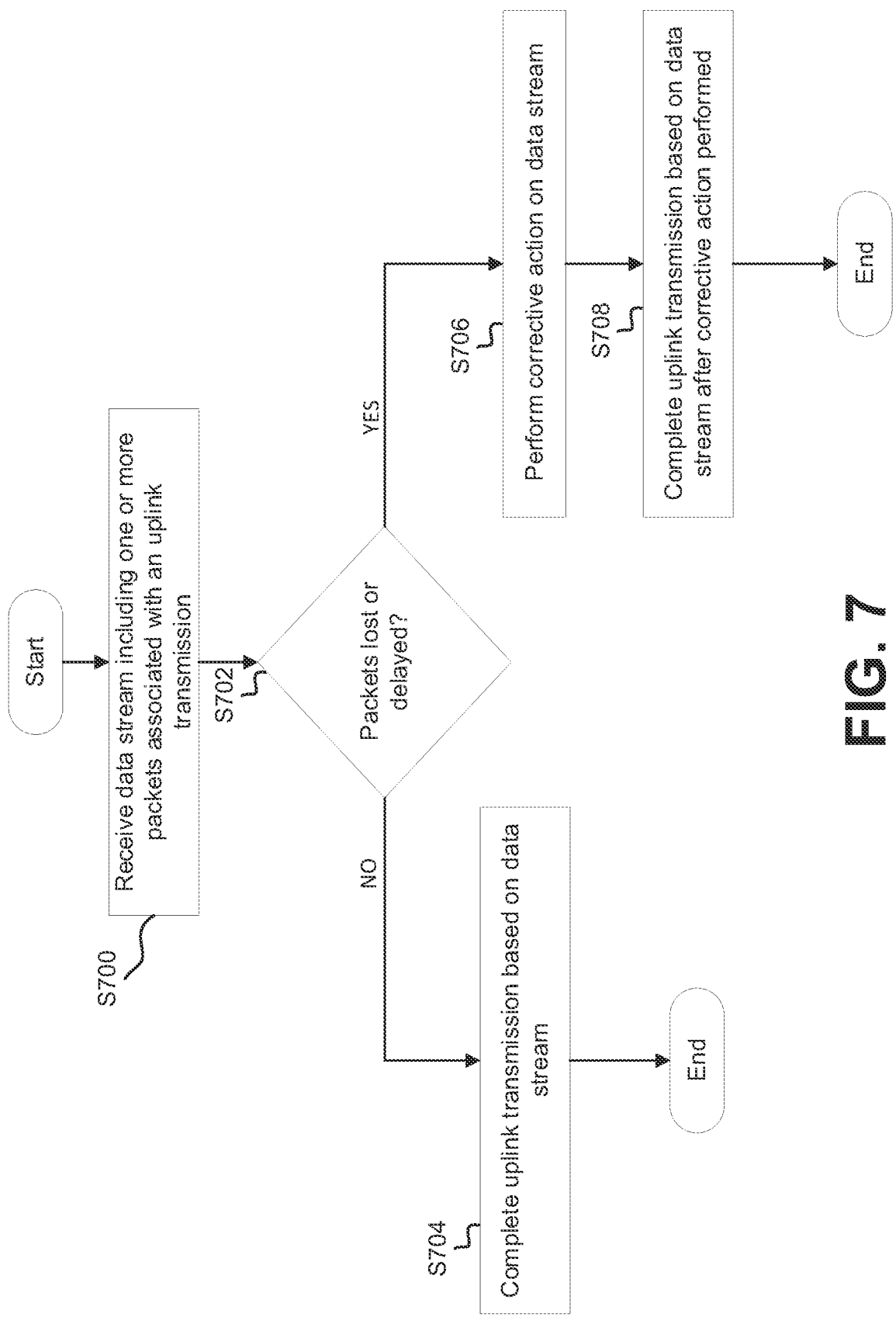
FIG. 7 is a flow chart of an example process for handling dropped or delayed packets.

FIG. 7 illustrates of a flowchart of an embodiment of a process for handling lost or delayed packets. The process may start at step S700 where a data stream including one or more packets associated with an uplink transmission are received. The process proceeds to step S702 to determine if packets from the data stream were lost or delayed. For example, the sequence numbers of the received packets may be analyzed to determine whether packets were lost or delayed.

If it is determined no packets were delayed or lost, the process proceeds to step S704 to complete the uplink transmission based on the received data stream. If it is determined packets are lost or delayed, the process proceeds to step S706 where a corrective action is performed on the data stream. For example, when there are multiple streams, data from another stream may be copied to the stream that did not properly receive the data. As another example, when there are multiple streams, the stream that did not properly receive the data may be zeroed out or not used during combining. The process proceeds to step S708 where the uplink transmission is completed based on the data stream after the corrective action is performed. As a part of completing the uplink transmission, the data received may be combined. For example, referring to FIG. 4A, the data received on each stream may be combined. Referring to FIG. 4B, each received data repetition on each stream may be combined. The process illustrated in FIG. 7 may be completed after step S704 or step S708 are performed.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor in a network node operating in a wireless communication network, the method includes: receiving, from at least one user equipment (UE), a data stream including one or more data packets associated with an uplink transmission between the UE and the network node: analyzing the data stream to determine whether the at least one UE transmitted one or more data packets not received by the network node: in response to determining the at least one UE transmitted the one or more data packets not received by the network node, performing a corrective action on the data stream; and completing the uplink transmission based on the data stream after the corrective action is performed.

(2) The method according to feature (1), in which the analyzing the data stream includes analyzing a sequence number associated with the one or more data packets included in the received data stream, and in which it is determined the at least one UE transmitted the one or more data packets not received by the network node in response to a determination the one or more data packets in the received data stream are received out of sequence.

(3) The method according to feature (1) or (2), in which the uplink transmission includes a request to connect with a physical random access shared channel (PRACH), and in which the data stream of the one or more data packets correspond to one or more PRACH preamble sequences.

(4) The method according to feature (3), in which the network node includes a plurality of antennas, and in which the one or more PRACH preamble sequences includes a PRACH preamble sequence without repetition.

(5) The method according to feature (4), in which in response to a determination a first antenna from the plurality of antennas did not receive the PRACH preamble sequence without repetition, the performing the corrective action on the data stream includes one of (i) copying the data stream from a second antenna from the plurality of antennas that received the data stream to the first antenna or (ii) zeroing out the data on the first antenna, and in which the completing the uplink transmission further includes combining data from each antenna of the plurality of antennas.

(6) The method according to feature (3), in which the network node includes a plurality of antennas, and in which the one or more PRACH preamble sequences include a plurality of PRACH preamble sequence repetitions.

(7) The method according to feature (4), in which in response to a determination a first antenna from the plurality of antennas did not receive a repetition from the plurality of PRACH preamble sequence repetitions, the performing the corrective action on the data stream includes one of (i) zeroing out the repetition that was not received on the first antenna, (ii) discarding data on the first antenna corresponding to the repetition that was not received, or (iii) copying data corresponding to the repetition that was not received from a second antenna from the plurality of antennas that received the repetition not received by the first antenna, and in which the completing the uplink transmission includes combining data from each antenna of the plurality of antennas.

(8) The method according to feature (3), in which a number of antennas of the network node is one, in which the one or more PRACH preamble sequences include a plurality of PRACH preamble sequence repetitions, in which in response to a determination the antenna of the network nodes does not receive a repetition from the plurality of PRACH preamble sequence repetitions, the performing the corrective action on the data stream includes one of (i) zeroing out the repetition that was not received on the antenna, or (ii) discarding data on the antenna corresponding to the repetition that was not received, and in which the completing the uplink transmission includes combining each PRACH preamble sequence repetition received on the antenna.

(9) The method according to feature (3), in which a number of antennas of the network node is one, in which the one or more PRACH preamble sequences includes a PRACH preamble sequence without repetition, in which in response to a determination an antenna of the network nodes does not receive the PRACH preamble sequence without repetition, the performing the corrective action on the data stream includes performing a corrective action at a Media Access Control (MAC) layer.

(10) The method according to any one of features (1)-(9), in which the uplink transmission includes (i) a request to connect with a Physical Uplink Control Channel (PUCCH) or (ii) data transmitted on the Physical Uplink Shared Channel (PUSCH), and in which the data stream of the one or more data packets corresponds to control information.

(11) The method according to feature (10), in which the network node includes a plurality of antennas, and in which in response to a determination a first antenna from the plurality of antennas did not receive the control information, the performing the corrective action on the data stream includes one of one of (i) copying the data stream from a second antenna from the plurality of antennas that received the data stream to the first antenna or (ii) zeroing out the data on the first antenna, and in which the completing the uplink transmission further includes combining data from each antenna of the plurality of antennas.

(12) A network node operating in a wireless communication network, the network node including: at least one memory configured to store computer program code; and at least one processor configured to access said at least one memory and operate as instructed by said computer program code, said computer program code including: receiving code configure to cause at least one of said at least one processor to receive, from at least one user equipment (UE), a data stream including one or more data packets associated with an uplink transmission between the UE and the network node, analyzing code configured to cause at least one of said at least one processor to analyze the data stream to determine whether the at least one UE transmitted one or more data packets not received by the network node, in response to determining the at least one UE transmitted the one or more data packets not received by the network node, performing code configured to cause at least one of said at least one processor to perform a corrective action on the data stream, and completing code configured to cause at least one of said at least one processor to complete the uplink transmission based on the data stream after the corrective action is performed.

(13) The network node according to feature (12), in which the analyzing code is further configured to cause at least one of said at least one processor to analyze a sequence number associated with the one or more data packets included in the received data stream, and in which it is determined the at least one UE transmitted the one or more data packets not received by the network node in response to a determination the one or more data packets in the received data stream are received out of sequence.

(14) The network node according to feature (12) or (13), in which the uplink transmission includes a request to connect with a physical random access shared channel (PRACH), and in which the data stream of the one or more data packets correspond to one or more PRACH preamble sequences.

(15) The network node according to feature (14), further including: a plurality of antennas, in which the one or more PRACH preamble sequences includes a PRACH preamble sequence without repetition.

(16) The network node according to feature (15), in which in response to a determination a first antenna from the plurality of antennas did not receive the PRACH preamble sequence without repetition, the performing code is further configured to cause at least one of said at least one processor to perform one of (i) copy the data stream from a second antenna from the plurality of antennas that received the data stream to the first antenna or (ii) zero out the data on the first antenna, and in which the completing code is further configured to cause at least one of said at least one processor to combine data from each antenna of the plurality of antennas.

(17) The network node according to feature (14), in which the network node includes a plurality of antennas, and in which the one or more PRACH preamble sequences include a plurality of PRACH preamble sequence repetitions.

(18) The network node according to feature (15), in which in response to a determination a first antenna from the plurality of antennas did not receive a repetition from the plurality of PRACH preamble sequence repetitions, the performing code is further configured to cause at least one of said at least one processor to perform one of (i) zero out the repetition that was not received on the first antenna, (ii) discard data on the first antenna corresponding to the repetition that was not received, or (iii) copy data corresponding to the repetition that was not received from a second antenna from the plurality of antennas that received the repetition not received by the first antenna, and in which the completing the uplink transmission includes combining data from each antenna of the plurality of antennas.

(19) The network node according to feature (15), in which a number of antennas of the network node is one, in which the one or more PRACH preamble sequences include a plurality of PRACH preamble sequence repetitions, in which in response to a determination the antenna of the network nodes does not receive a repetition from the plurality of PRACH preamble sequence repetitions, the performing code is further configured to cause at least one of said at least one processor to perform one of (i) zero out the repetition that was not received on the antenna, or (ii) discard data on the antenna corresponding to the repetition that was not received, and in which the completing code is further configured to cause at least one of said at least one processor to combine each PRACH preamble sequence repetition received on the antenna.

(20) A non-transitory computer readable medium having instructions stored therein, which when executed by a processor in a network node operating in a wireless communication network cause the processor to execute a method including: receiving, from at least one user equipment (UE), a data stream including one or more data packets associated with an uplink transmission between the UE and the network node; analyzing the data stream to determine whether the at least one UE transmitted one or more data packets not received by the network node: in response to determining the at least one UE transmitted the one or more data packets not received by the network node, performing a corrective action on the data stream: and completing the uplink transmission based on the data stream after the corrective action is performed.

What is claimed is:

1. A method performed by at least one processor in a network node operating in a wireless communication network, the method comprising:
   receiving, from at least one user equipment (UE), a data stream including one or more data packets associated with an uplink transmission between the UE and the network node;
   analyzing the data stream to determine whether the at least one UE transmitted one or more data packets not received by the network node;
   in response to determining the at least one UE transmitted the one or more data packets not received by the network node, performing a corrective action on the data stream; and
   completing the uplink transmission based on the data stream after the corrective action is performed,
   wherein the network node includes a plurality of antennas and:
      in response to a determination a first antenna from the plurality of antennas did not receive one or more data packets without repetition, the performing the corrective action on the data stream includes one of (i) copying the data stream from a second antenna from the plurality of antennas that received the data stream to the first antenna or (ii) zeroing out the data on the first antenna, and
      in response to a determination the first antenna from the plurality of antennas did not receive a repetition from among one or more data packets with repetition, the performing the corrective action on the data stream includes one of (i) zeroing out the repetition that was not received on the first antenna, (ii) discarding data on the first antenna corresponding to the repetition that was not received, or (iii) copying data corresponding to the repetition that was not received from a second antenna from the plurality of antennas that received the repetition not received by the first antenna; or
   wherein a number of antennas of the network node is one and:
      in response to a determination the antenna of the network node does not receive a repetition from among one or more data packets with repetitions, the performing the corrective action on the data stream includes one of (i) zeroing out the repetition that was not received on the antenna, or (ii) discarding data on the antenna corresponding to the repetition that was not received, and
      in response to a determination the antenna of the network nodes does not receive a data packet without repetition, the performing the corrective action on the data stream includes performing a corrective action at a Media Access Control (MAC) layer.

2. The method according to claim 1, wherein the analyzing the data stream includes analyzing a sequence number associated with the one or more data packets included in the received data stream, and wherein it is determined the at least one UE transmitted the one or more data packets not received by the network node in response to a determination the one or more data packets in the received data stream are received out of sequence.

3. The method according to claim 1, wherein the uplink transmission includes a request to connect with a physical random access shared channel (PRACH), and wherein the data stream of the one or more data packets correspond to one or more PRACH preamble sequences.

4. The method according to claim 3,
wherein the network node includes the plurality of antennas, and
wherein the one or more PRACH preamble sequences includes a PRACH preamble sequence without repetition.

5. The method according to claim 4,
wherein in response to a determination the first antenna from the plurality of antennas did not receive the PRACH preamble sequence without repetition, the performing the corrective action on the data stream includes one of (i) copying the data stream from a second antenna from the plurality of antennas that received the data stream to the first antenna or (ii) zeroing out the data on the first antenna, and
wherein the completing the uplink transmission further includes combining data from each antenna of the plurality of antennas.

6. The method according to claim 4,
wherein in response to a determination the first antenna from the plurality of antennas did not receive a repetition from the plurality of PRACH preamble sequence repetitions, the performing the corrective action on the data stream includes one of (i) zeroing out the repetition that was not received on the first antenna, (ii) discarding data on the first antenna corresponding to the repetition that was not received, or (iii) copying data corresponding to the repetition that was not received from a second antenna from the plurality of antennas that received the repetition not received by the first antenna, and
wherein the completing the uplink transmission includes combining data from each antenna of the plurality of antennas.

7. The method according to claim 3,
wherein the network node includes the plurality of antennas, and
wherein the one or more PRACH preamble sequences include a plurality of PRACH preamble sequence repetitions.

8. The method according to claim 3,
wherein the number of antennas of the network node is one,
wherein the one or more PRACH preamble sequences include a plurality of PRACH preamble sequence repetitions,
wherein in response to a determination the antenna of the network nodes does not receive a repetition from the plurality of PRACH preamble sequence repetitions, the performing the corrective action on the data stream includes one of (i) zeroing out the repetition that was not received on the antenna, or (ii) discarding data on the antenna corresponding to the repetition that was not received, and
wherein the completing the uplink transmission includes combining each PRACH preamble sequence repetition received on the antenna.

9. The method according to claim 3,
wherein the number of antennas of the network node is one,
wherein the one or more PRACH preamble sequences includes a PRACH preamble sequence without repetition,
wherein in response to a determination an antenna of the network nodes does not receive the PRACH preamble sequence without repetition, the performing the corrective action on the data stream includes performing a corrective action at a Media Access Control (MAC) layer.

10. The method according to claim 1, wherein the uplink transmission includes (i) a request to connect with a Physical Uplink Control Channel (PUCCH) or (ii) data transmitted on the Physical Uplink Shared Channel (PUSCH), and wherein the data stream of the one or more data packets corresponds to control information.

11. The method according to claim 10,
wherein the network node includes the plurality of antennas, and
wherein in response to a determination the first antenna from the plurality of antennas did not receive the control information, the performing the corrective action on the data stream includes one of one of (i) copying the data stream from a second antenna from the plurality of antennas that received the data stream to the first antenna or (ii) zeroing out the data on the first antenna, and
wherein the completing the uplink transmission further includes combining data from each antenna of the plurality of antennas.

12. A network node operating in a wireless communication network, the network node comprising:
at least one memory configured to store computer program code; and
at least one processor configured to access said at least one memory and operate as instructed by said computer program code, said computer program code including:
receiving code configure to cause at least one of said at least one processor to receive, from at least one user equipment (UE), a data stream including one or more data packets associated with an uplink transmission between the UE and the network node,
analyzing code configured to cause at least one of said at least one processor to analyze the data stream to determine whether the at least one UE transmitted one or more data packets not received by the network node,
in response to determining the at least one UE transmitted the one or more data packets not received by the network node, performing code configured to cause at least one of said at least one processor to perform a corrective action on the data stream, and
completing code configured to cause at least one of said at least one processor to complete the uplink transmission based on the data stream after the corrective action is performed,
wherein the network node includes a plurality of antennas and:
in response to a determination a first antenna from the plurality of antennas did not receive one or more data packets without repetition, the performing code is further configured to cause at least one of said at least one processor to perform one of (i) copying the data stream from a second antenna from the plurality of antennas that received the data stream to the first antenna or (ii) zeroing out the data on the first antenna, and in response to a determination the first antenna from the plurality of antennas did not receive a repetition from among one or more data packets with repetition, the performing code is further configured to cause at least one of said at least one processor to perform one of (i) zeroing out the repetition that was not received on the first antenna, (ii) discarding data on the first antenna corresponding to the repetition that was not received, or (iii) copying data corresponding to the repetition that was not received from a second antenna from the plurality of antennas that received the repetition not received by the first antenna; or wherein a number of antennas of the network node is one and:

in response to a determination the antenna of the network node does not receive a repetition from among one or more data packets with repetitions, the performing code is further configured to cause at least one of said at least one processor to perform one of (i) zeroing out the repetition that was not received on the antenna, or (ii) discarding data on the antenna corresponding to the repetition that was not received, and in response to a determination the antenna of the network nodes does not receive a data packet without repetition, the performing code is further configured to cause at least one of said at least one processor to perform a corrective action at a Media Access Control (MAC) layer.

13. The network node according to claim 12, wherein the analyzing code is further configured to cause at least one of said at least one processor to analyze a sequence number associated with the one or more data packets included in the received data stream, and wherein it is determined the at least one UE transmitted the one or more data packets not received by the network node in response to a determination the one or more data packets in the received data stream are received out of sequence.

14. The network node according to claim 12, wherein the uplink transmission includes a request to connect with a physical random access shared channel (PRACH), and wherein the data stream of the one or more data packets correspond to one or more PRACH preamble sequences.

15. The network node according to claim 14, further comprising:
the plurality of antennas,
wherein the one or more PRACH preamble sequences includes a PRACH preamble sequence without repetition.

16. The network node according to claim 15,
wherein in response to a determination the first antenna from the plurality of antennas did not receive the PRACH preamble sequence without repetition, the performing code is further configured to cause at least one of said at least one processor to perform one of (i) copy the data stream from a second antenna from the plurality of antennas that received the data stream to the first antenna or (ii) zero out the data on the first antenna, and
wherein the completing code is further configured to cause at least one of said at least one processor to combine data from each antenna of the plurality of antennas.

17. The network node according to claim 15,
wherein in response to a determination the first antenna from the plurality of antennas did not receive a repetition from the plurality of PRACH preamble sequence repetitions, the performing code is further configured to cause at least one of said at least one processor to perform one of (i) zero out the repetition that was not received on the first antenna, (ii) discard data on the first antenna corresponding to the repetition that was not received, or (iii) copy data corresponding to the repetition that was not received from a second antenna from the plurality of antennas that received the repetition not received by the first antenna, and
wherein the completing the uplink transmission includes combining data from each antenna of the plurality of antennas.

18. The network node according to claim 15,
wherein the number of antennas of the network node is one,
wherein the one or more PRACH preamble sequences include a plurality of PRACH preamble sequence repetitions,
wherein in response to a determination the antenna of the network nodes does not receive a repetition from the plurality of PRACH preamble sequence repetitions, the performing code is further configured to cause at least one of said at least one processor to perform one of (i) zero out the repetition that was not received on the antenna, or (ii) discard data on the antenna corresponding to the repetition that was not received, and
wherein the completing code is further configured to cause at least one of said at least one processor to combine each PRACH preamble sequence repetition received on the antenna.

19. The network node according to claim 14,
wherein the network node includes the plurality of antennas, and
wherein the one or more PRACH preamble sequences include a plurality of PRACH preamble sequence repetitions.

20. A non-transitory computer readable medium having instructions stored therein, which when executed by a processor in a network node operating in a wireless communication network cause the processor to execute a method comprising:
receiving, from at least one user equipment (UE), a data stream including one or more data packets associated with an uplink transmission between the UE and the network node;
analyzing the data stream to determine whether the at least one UE transmitted one or more data packets not received by the network node;
in response to determining the at least one UE transmitted the one or more data packets not received by the network node, performing a corrective action on the data stream; and
completing the uplink transmission based on the data stream after the corrective action is performed,
wherein the network node includes a plurality of antennas and:
in response to a determination a first antenna from the plurality of antennas did not receive one or more data packets without repetition, the performing the corrective action on the data stream includes one of (i) copying the data stream from a second antenna from the plurality of antennas that received the data stream to the first antenna or (ii) zeroing out the data on the first antenna, and
in response to a determination the first antenna from the plurality of antennas did not receive a repetition from among one or more data packets with repetition, the performing the corrective action on the data stream includes one of (i) zeroing out the repetition that was not received on the first antenna, (ii) discarding data on the first antenna corresponding to the repetition that was not received, or (iii) copying data corresponding to the repetition that was not received from a second antenna from the plurality of antennas that received the repetition not received by the first antenna; or wherein a number of antennas of the network node is one and:
  in response to a determination the antenna of the network node does not receive a repetition from among one or more data packets with repetitions, the performing the corrective action on the data stream includes one of (i) zeroing out the repetition that was not received on the antenna, or (ii) discarding data on the antenna corresponding to the repetition that was not received, and
  in response to a determination the antenna of the network nodes does not receive a data packet without repetition, the performing the corrective action on the data stream includes performing a corrective action at a Media Access Control (MAC) layer.

* * * * *